Nov. 10, 1942.   C. I. BRADFORD   2,301,197
MEASURING INSTRUMENT
Filed Sept. 26, 1941   2 Sheets-Sheet 1

INVENTOR
COLIN IRVING BRADFORD
BY
ATTORNEYS

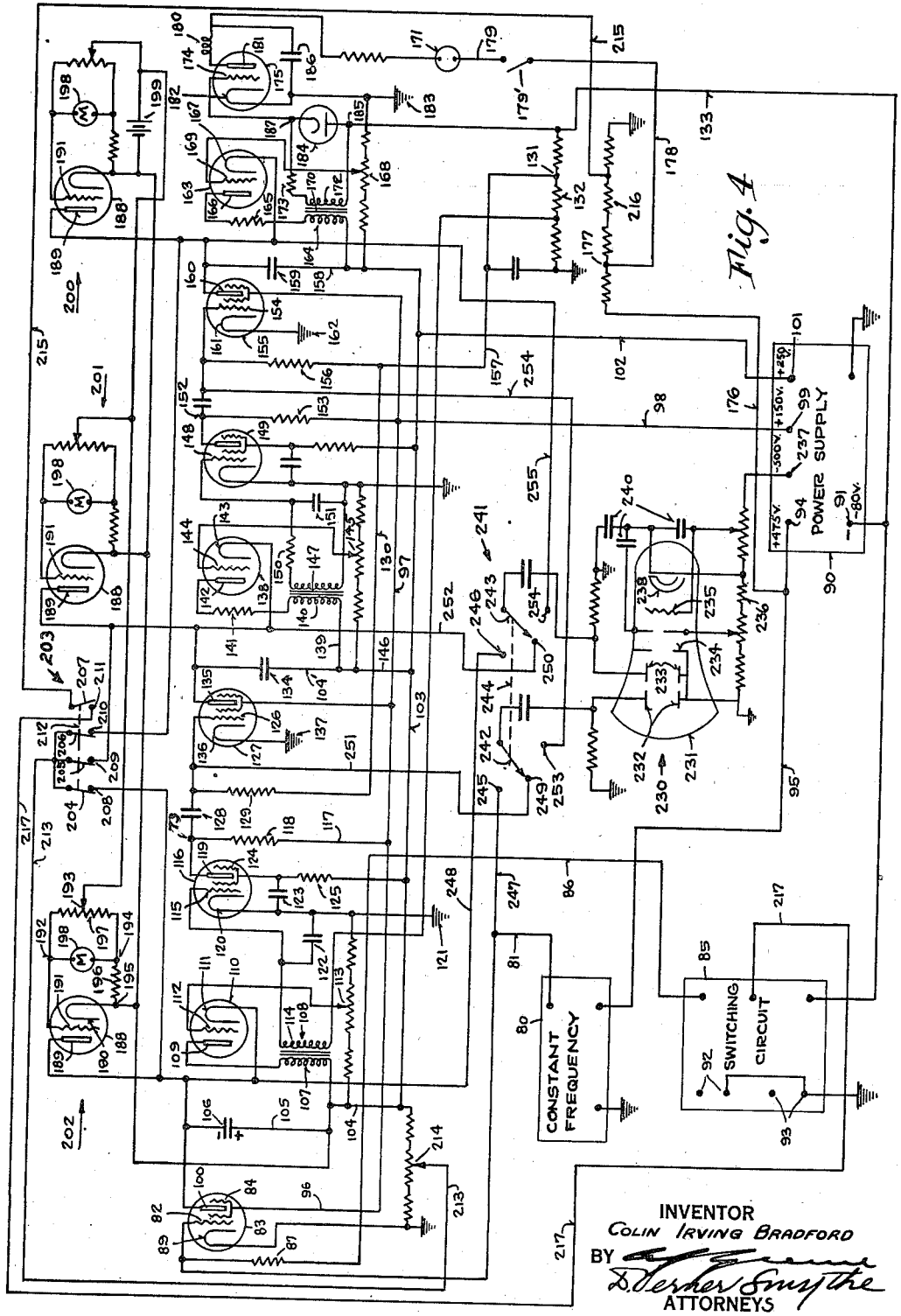

Patented Nov. 10, 1942

2,301,197

UNITED STATES PATENT OFFICE 2,301,197

MEASURING INSTRUMENT

Colin Irving Bradford, Fairfield, Conn., assignor to Remington Arms Company, Inc., a corporation of Delaware Application September 26, 1941, Serial No. 412,473

15 Claims. (Cl. 161—15)

This invention relates to an apparatus for counting impulses and particularly impulses of a known frequency over an interval so as to measure the time of the interval. It will be described particularly in its use in an instrument for measuring time intervals, although it is to be distinctly understood that it is applicable to other than time measuring instruments. Accurate measurement of time intervals is needed in many precision devices, and as one example thereof, a device for measurement of the time of flight of a projectile through the barrel of a gun may be cited. Accurate measurements of time intervals are also desired in other instruments such as depth sounding devices, instruments for measuring the operation of relays and circuit breakers, and locators, and many other operations involving time intervals from which an electrical impulse can be obtained at the beginning and end of the interval. The invention may also be used for any purpose wherein two impulses are available, denoting the beginning or end of the interval, operation or process involved, and in which there are impulses to be counted during the interval.

One of the objects of this invention is to provide an accurate instrument for measurement of short or long time intervals which is extremely accurate and can be easily read by an operator for a period of time after the operation has taken place. From the following illustrative description in which are disclosed certain embodiments of the invention as well as means and details of carrying it out, it will become apparent how the foregoing and other objects may be accomplished.

In the drawings:

Fig. 4 is a circuit diagram of an instrument having four counting scales, a monitoring device and various other features which will appear in the detailed description thereof.

F'g. 7 is a graph showing the relation between plate voltage and plate current of a desirable tube.

Most of the methods of measuring short time intervals measure the time in terms of some other factor. As an example, the Boulenge chronograph measures time in terms of distance and the gravitational constant. This is done by means of the release and free drop of a rod, a mark being placed thereon denoting the end of the interval. Other types of chronoscopes measure time in terms of an electrical charge, whereas, in the present invention, the time is measured in terms of time. The basis of operation of this invention is the counting of the number of cycles of a known frequency source elapsing during the unknown interval. When it is used to measure irregular impulses, it is evident that the interval may be predetermined and that the instrument will then read the number of impulses received during said predetermined interval. The source of constant frequency may be held to within a few parts in a million by various well-known means. An example of such is a conventional piezo-electrical crystal standard frequency apparatus. If the frequency is chosen high enough, errors in practical measurements will be negligible. By choosing one hundred thousand cycles per second as a standard frequency, the interval can be measured to within $1/100000$ of a second.

In the present invention, means are provided to successively produce one impulse for a given number of impulses, and to record the number of impulses in each stage at the end of the interval; for example, the source of constant frequency can be employed to charge a first condenser a predetermined number of impulses, which will then break down and produce a single impulse. This single impulse may be impressed upon the next condenser, which can be designed to build up the same predetermined number of impulses and create an impulse which may be impressed on the next measuring condenser, this being repeated until the desired number of numerical places are obtained. It is, of course, to be understood that the first condenser immediately upon discharge will repeatedly charge and discharge during the interval, and similarly for the other measuring condensers. Then, when the interval is completed, the charge on each condenser or the number of impulses on each condenser may be measured, which will give a time interval measurement.

Figure 1:
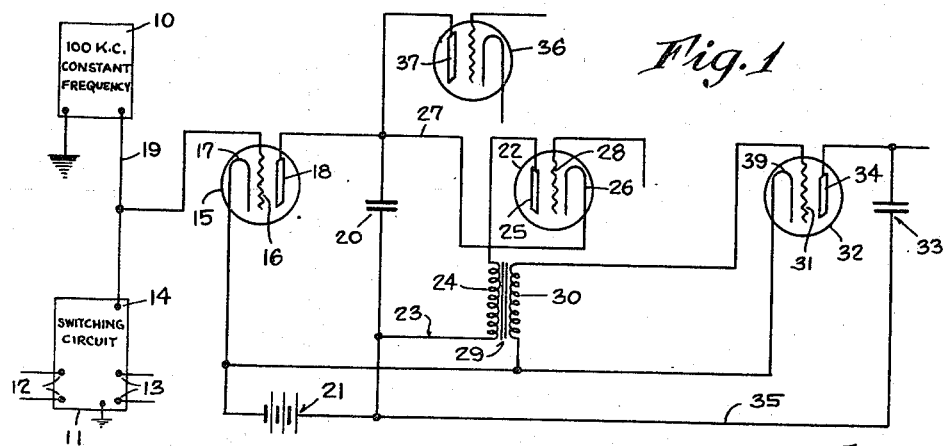
Fig. 1 is a fragmentary and schematic diagram showing one of the fundamental circuits of the present invention.
Figure 7:
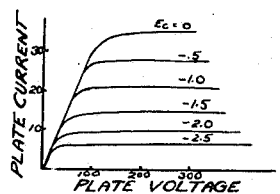

Referring particularly to Fig. 1, there will be found the bare essentials of a fundamental circuit which may be employed, it being understood, of course, that certain of the usual condensers and resistances are omitted for purposes of illustration. At 10 there is indicated diagrammatically a source of constant frequency, which in this case may be 100 kilocycles, although it is to be distinctly understood that the frequency used is a matter of choice and may be other than 100 kilocycles. The details of the source of constant frequency will be discussed at a later point. 11 represents diagrammatically a switching circuit having an input between terminals 12 and an input between terminals 13. An input may be used to receive an impulse at the beginning of the interval and one for an impulse at the end of the interval so as to energize the switching circuit during the interval. The output which is employed may be at terminal 14. A tube 15 having a control grid 16, cathode 17 and plate 18 is used. It is to be understood that wherever the term "cathode" is used, it may be indirectly or directly heated, and that "plate" means the same as "anode" and "control grid" the same as "control element." The plate voltage vs. plate current family of characteristics should be similar to that shown in Fig. 7, having substantially flat plate current vs. plate voltage curves. As is well known in the art, various types of tubes may be used to obtain such a characteristic, and as an example of such a tube, a pentode 1852 may be used, although it is distinctly understood that the invention is not limited thereto. The graph shown in Fig. 7 is specifically for an 1852 pentode and is that desirable for the scaling tube. Tube 15 may be called the scaling tube and tube 22 the discharge tube. The output 19 of the source of constant frequency is impressed on the grid 16. The grid, however, is biased so that the tube remains normally non-conducting, except during the time of the interval. It is evident that the tube will conduct during the recurrent pulses of the source which may or may not occur at the exact instant the bias of the tube is changed so that it becomes conductive or capable of conducting the impulses. The switching circuit at 11 will be described later, but in general it may be of the type shown in applications, S. N. 276,167 or 334,300, or any other suitable kind. In such a switching circuit, a flow of current occurs during the interval, and the potential developed as the result thereof may be impressed upon grid 16. This will so bias the grid that during the positive half cycles of the source of constant frequency the tube will become conducting and an impulse will take place in the plate circuit thereof during each positive half cycle of the source of constant frequency. Inasmuch as this is during the interval, it will be evident that the number of impulses passing through the plate circuit of tube 15 will give a direct indication of the time. Because there are so many of these impulses in a short space of time, it is necessary to provide some means of measuring them. This means must be accurate and give a direct and linear indication of the time. To accomplish this, a measuring condenser 20 is located in the plate-cathode circuit of tube 15, battery 21 furnishing a source of energy for this circuit. It is obvious that any indicating means capable of reading the number of impulses placed on a single measuring condenser would have increments for each impulse of such a size that it would be impossible to read the same. It is therefore necessary to discharge this condenser after a predetermined number and to start the charging of it again, at the same time counting the number of times the condenser is discharged. This is accomplished in the present invention by placing condenser 20 in the plate-cathode circuit of the electronic tube 22. This tube may be of the gaseous type or a high vacuum tube having triggering characteristics, and the term "electronic control tube" is to be understood to so mean. This circuit will then be from condenser 20, line 23, winding 24, plate 25, cathode 26, line 27, back to the condenser 20. Tube 22 is biased by means of a grid circuit including grid 28 in a conventional manner so that when a predetermined charge is placed on 20 by a predetermined number of impulses, the potential will be great enough to break down the tube 22 and allow the discharge of the condenser 20 through said tube and said circuit. The tube will immediately extinguish itself and condenser 20 will start charging again from tube 15. The passage of the impulse through winding 24 of transformer 29 will give an impulse in winding 30 which will be transmitted to the grid 31 of tube 32. This in turn will cause an impulse to pass through the plate-cathode circuit of said tube, placing a charge on the second measuring condenser 33, said circuit being from condenser 33, plate 34, cathode 39, battery 21, line 35, back to condenser 33. In this manner, for each discharge of condenser 20 due to a predetermined number of impulses thereon, an impulse will be placed on condenser 33. For a given frequency, if the time is sufficiently short, two measuring condensers may be enough, and in such cases the number of impulses placed on 33 may be measured and the number of impulses place on 20 may be measured. The question of accuracy is also involved because the number of digits readable will depend on the number of circuits. In usual practice, it is generally desirable to have a plurality of such circuits so that longer times may be measured or more readable digits provided. It is evident that the more impulses the measuring condenser is made to accumulate before discharging, the more difficult it will be to determine each increment on a meter because of the decreasing size of the increments on the scale of the meter. The remaining charge on 20 may be measured by some means, such as, for example, an inverted electron tube voltmeter having a tube 36 with the plate 37 used as the control electrode. The electronic tube voltmeter circuit, which may be used, will be described in detail in Fig. 4. As an example of operation, the condenser 20 may be made to discharge after ten impulses have been placed thereon, so that if the source of constant frequency is 100 kilocycles, condenser 20 will read 1/100000 second and condenser 33 will read 1/10000 second. It will be evident from the description following that suitable amplifiers may be used if desired between winding 30 and grid 31, and that various means may be used to count the number of impulses in the final stage, such as an electron tube voltmeter or an impulse counter, which will be described in connection with Fig. 4.

Figures 2, 6:
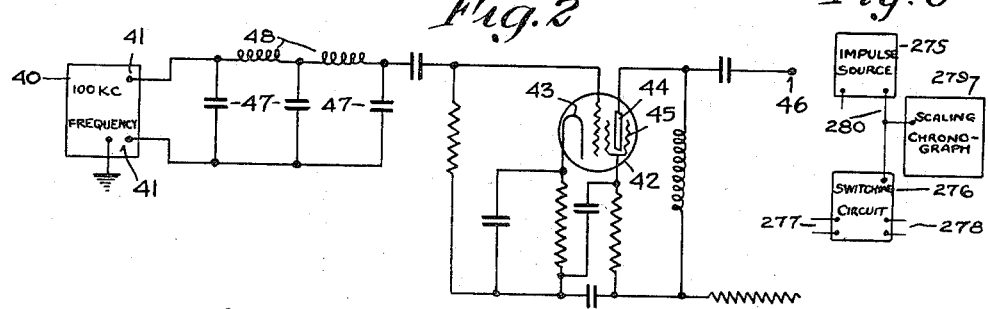
Fig. 2 is a circuit diagram of one form of the constant frequency generator and its amplifier.
Fig. 6 is a schematic diagram of a use of the invention for counting irregular impulses.
Figure 3:
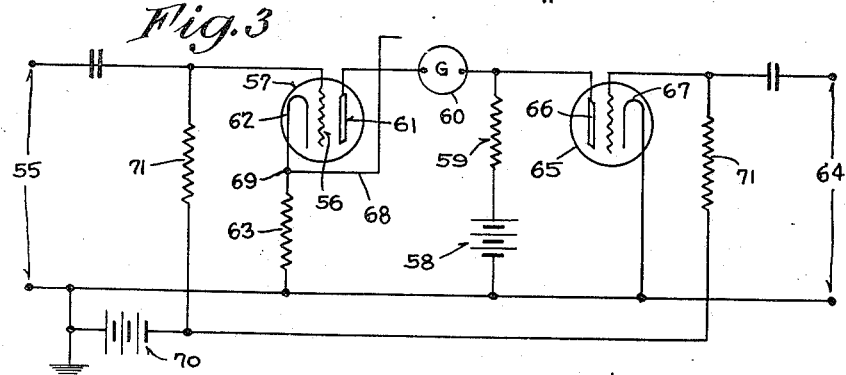
Fig. 3 is a circuit diagram of one type of switching circuit which may be used.

One kind of source of constant frequency and circuit is shown generally in Fig. 2, it being understood of course that this is merely an example and that other circuits and other frequencies may be used. 40 may represent a piezoelectric crystal constant frequency generator of conventional type having an output between terminals 41 to an amplifier tube 42 with a cathode 43, plate 44 and screen grid 45. An amplified 100 kilocycle source is then present at terminal 46, which may be impressed upon the grid of the first tube. The 100 kc. source shown at 40 may be of different types. The circuit specifically shown is one where a multivibrator, for example, having other frequencies present, is used, and in such a device, the condensers 47 and inductances 48 may be employed to filter out the undesirable frequencies. If the source is a pure frequency, then the filter will not normally be necessary, although it may be used if desired. An example of a switching circuit which can be used is shown in Fig. 3 and is generally similar to that disclosed in application S. N. 408,970. In this circuit, without discussing the details, the impulse at the beginning of the interval is placed across terminals 55. This appears on the control grid 56 of normally non-conducting "Thyratron" tube 57. When this occurs, a current is set up in the plate circuit of tube 57 from battery 58, resistance 59, galvanometer 60, plate 61, cathode 62, extinguishing resistance 63, back to the battery 58. When a second impulse is received at the end of the interval at terminals 64, normally non-conducting "Thyratron" tube 65 becomes conducting, the plate-cathode circuit being established from battery 58, resistance 59, plate 66, cathode 67, back to battery 58. Then, as explained in application S. N. 408,970, when tube 65 becomes conducting, the presence of the extinguishing resistance 63 depresses the potential available on plate 61 so that tube 57 is extinguished. Battery 70 and resistances 71 furnish the necessary grid bias for the tubes. It is to be understood, however, that in place of extinguishing resistance 63, other methods may be used as disclosed in the prior applications for the depressing of the plate potential of tube 57. A ballistic galvanometer 60 may be used to give a visual indication of the time of the interval, as described in said applications. Such indication, however, will be momentary only, as it is a ballistic galvanometer. This galvanometer, if it is employed, could be used to determine the time for counting irregular pulses. The lead 68 from point 69 may then be used to impress the raise of potential on the grid on the first tube of the scaling chronoscope of the present invention so that the source of constant frequency will start to charge the first measuring condenser and continue intermittently to charge the same while the plate circuit of tube 57 is conducting. It is seen, therefore, that conduction will take place in the first tube of the scaling chronoscope during the positive half cycles of the constant frequency, so that there will be intermittent conduction of tube 15 during the interval.

Referring now to Fig. 4, there is shown a complete measuring instrument having four counting steps together with a monitoring device and various other circuits, the counting circuits being in cascade. It is to be distinctly understood, of course, that more or less counting steps may be employed, as desired, such being selected in accordance with the counting ratio between steps, the length of the interval to be measured standard source of frequency is shown diagrammatically at 80 having an output at lead 81 which is connected to the control grid 82 of tube 83. Scaling tube 83 may be of the screen grid type with a screen grid at 84. The standard frequency generator may be similar to that shown in Fig. 2 or any other type desired. The switching circuit shown diagrammatically at 85 may be similar to that shown and described in Fig. 3, although this may also be of any desired type, said switching circuit furnishing a source of potential during the interval to be measured. The control potential of this switching circuit is impressed on grid 82 by lead 86, through a resistance 87. At 90 there is shown diagrammatically a power supply having various terminals which may supply the voltage indicated at each terminal. It is to be understood, of course, that such voltages vary in accordance with the constants of the circuit and tubes used, and are merely illustrative. The switching circuit may obtain its source of negative bias from terminal 91 of the power supply and its positive source through lead 217, switch 207, lead 215, voltage divider 216, lead 176 and terminal 94. Terminals 92 may represent the first input terminals of the switching circuit and terminals 93 the second input circuit for the purpose of causing the energization of the switching circuit during the interval. The constant frequency generator may receive its power from terminal 94 through lead 95. The screen grid 84 of tube 83 may be connected by lead 96, lead 97, lead 98 to terminal 99 of the power supply. The circuit is so adjusted that when the switching circuit is energized between impulses received at terminals 92 and 93, the grid 82 will be so biased so as to allow conduction in the plate circuit of tube 83 during the positive half cycles of the constant frequency source. The plate circuit of tube 83 is from terminal 101 of power supply, lead 102, lead 103, lead 104, lead 105, measuring condenser 106, plate 100, cathode 89 to ground. In this way, the condenser 106 will receive a charge during each intermittent conduction of tube 83. Measuring condenser 106 will be charged to a potential with a polarity indicated and the discharge circuit therefore is through lead 105, winding 107 of the transformer 108, plate 109 of "Thyratron" discharge tube 110, cathode 111, back to the other side of condenser 106. As explained in connection with Fig. 1, when a predetermined number of impulses have been placed on condenser 106, the breakdown voltage of 110 will be reached so that the condenser will discharge through the plate-cathode circuit thereof. The bias on the grid 112 of tube 110 may be regulated by means of the variable potentiometer 113, which receives power supply from lead 104, lead 103, lead 102, and terminal 101. An impulse through winding 107 of transformer 108 will cause an impulse to appear on winding 114, which will in turn drive the grid 115 of amplifying tube 116 more negative so as to cause an impulse to appear in the plate-cathode circuit thereof. This plate circuit may be traced from terminal 99, lead 98, lead 97, lead 117, resistance 118, plate 119, cathode 120, back to ground at 121. A condenser 122 may be provided across grid 115 and cathode 120. To improve the shape of the impulses on the grid of tube 116, a conventional condenser 123 is used across the screen grid connection of tube 116. Screen grid 124 of tube 116 may receive its source of supply through resistance 125 and lead 103. Due to the negative impulse on the grid 115, the flow through resistance 118 will be decreased so that the potential at point 73 will be raised, thereby placing a positive impulse on grid 126 of tube 127 through the coupling condenser 128. The grid bias for tube 127 is obtained through resistance 129, lead 130, lead 157, point 131, voltage divider 132, lead 133, to negative terminal 91 of the power supply. Tube 127 functions in a manner generally similar to tube 83 so that the impulse placed thereon by the discharge of the preceding measuring condenser 106, causes a flow in plate-cathode circuit of tube 127 from terminal 101, lead 102, lead 103, lead 104', the second measuring condenser 134, plate 135, cathode 136, ground 131. This causes a charge to be placed upon the measuring condenser 134, which is a sub-multiple of the number of impulses placed upon measuring condenser 106. Measuring condenser 134 is in the plate-cathode circuit of the gaseous tube 138 from lead 104', lead 139, winding 140, resistance 141, plate 142, cathode 143, back to the other side of condenser 134. The condenser 134 is discharged in this manner when a predetermined number of impulses have been placed on condenser 134 by the intermittent conduction of tube 110, caused by discharge of condenser 106. The intermittent conduction is amplified by tube 116. The grid 144 of tube 138 is given a proper bias by potentiometer 145, which receives its power supply from lead 146, lead 103, lead 102 and terminal 101. The impulse in winding 140 of transformer 147 is placed upon the grid 148 of the second amplifying tube 149 in a manner similar to that described for tube 116. A resistance 150 and the condenser 151 are provided for the purpose of improving the shape of the impulses on tube 149. The transformer 147 is so connected that the impulse through tube 138 will drive the grid 148 more negative so that the plate current through tube 149 will be decreased. As a result, point 152 will have its potential raised, due to the decrease in flow through resistance 153, which in turn will raise the potential of grid 154 of tube 155. The grid 154 of tube 155 obtains its bias through the biasing resistance 156, lead 157, point 131, lead 133 to terminal 91. A flow is set up during this pulse through the plate circuit of 155 from terminal 101, lead 102, lead 158, the third measuring condenser 159, plate 160, cathode 161 to ground 162. After a predetermined number of pulses have been placed on measuring condenser 159, it will cause tube 163 to break down and the condenser will be discharged through the plate-cathode circuit thereof through lead 158, winding 164, resistance 165, plate 166, cathode 167, back to the other side of measuring condenser 159. The bias for the grid 169 of tube 163 will be obtained from variable potentiometer 168. It is to be understood that other counting and amplifying stages may be placed in the circuit, if desired, at this point. However, if sufficient stages are present to reduce the impulse interval to 1/100 of a second, an impulse counter may be placed in the circuit responsive to the impulses through transformer 170. Counters are available, such as those manufactured by the Central Scientific Instrument Company, known as the "High Speed Cenco Counter," which will indicate directly 1/100 of a second. Such a counter is indicated diagrammatically at 171, and the impulses therefor may be obtained from winding 172 of transformer 170 through resistance 173 to the grid 174 of amplifier tube 175. As the grid 174 has an impulse placed thereon, the plate-cathode circuit of tube 175 will have a current flow produced therein which will energize the impulse counter 171. The current will flow from terminal 94, lead 176, point 177, lead 178, lead 179, counter 171, inductance 180, plate 181, cathode 182, back to ground at 183. The desired impulses on grid 174 are positive so that tube 184 is used to eliminate any negative impulses. This is accomplished by connecting tube 184 so that when point 187 becomes negative with respect to 185, the tube will conduct and short circuit the negative pulse. The switch 179' may be used to disconnect the counter 171 when desired.

After the interval has been completed, it will be seen that there will be charges present on each of the measuring condensers. The charge on each of these condensers may be measured by means of an inverted electron tube voltmeter which will be described specifically for the first measuring condenser, the successive electron tube voltmeters being identical thereto and having the same numerals placed thereon. The charges so measured will be an indication of the number of impulses on each condenser, which in turn will be the number of known time intervals from which the total time interval can be determined. The electron tube voltmeter comprises a tube 188 and a conventional plate 189, conventional cathode 190, and conventional grid 191. It is necessary that the leakage in this circuit be a minimum, and for this reason the conventional plate 189 is employed as the control element, and the conventional grid 191 is used as the anode. The tube 188 is in a Wheatstone bridge circuit having apexes 192, 193, 194, 195. The tube is in the leg 192—195; resistance 196 is in the leg 195—194; part of resistance 197 is in leg 194—193; and the other part of resistance 197 is in leg 193—192. It is seen, therefore, that as the potential is changed on control element 189, that the balance will be upset in the bridge and the meter 198 will record the difference or the potential that is present on the measuring condenser 106. The plate 189 is connected to the side of the condenser which becomes negative so that the flow through 188 is reduced as the charge builds up on condenser 106 and therefore the tube cannot be overloaded. 197 is a variable potentiometer so that the bridge may be suitably balanced. The power supply for the electronic tube voltmeter is across apexes 193 and 195 and is furnished by battery 199. By this means, each of the electronic tube voltmeters will give an indication of the number of pulses remaining on each of the measuring condensers. Then, if a frequency of 100 kc. and a scaling rate of 10 to 1 in each of the scaling circuits be used, the impulse counter 171 will read .01 second, voltmeter circuit 200 will read .001 second, voltmeter circuit 201 will read .0001 second, and voltmeter circuit 202 will read .00001 second. Other types of meters or recorders may be used if desired.

In order to reset the device for another operation, it is necessary to discharge the condensers. This may be done by use of the switch shown diagrammatically at 203 having blades 204, 205, 206 and 207 adapted to engage contacts 208, 209, 210 and 211 respectively. A switch operator is shown schematically at 212 which may be used for moving the blades in unison. The switch is shown in its resetting position, adapted to discharge the condensers. It is not desirable to discharge the condensers entirely, but only to the point at which they are completed discharged in operation of the device; and this is approximately 15 volts because the three discharge tubes are gaseous filled with about a 15 volt terminal drop. It is to be understood, of course, that as the type of tubes or the tube during its life varies, other voltages may be desirable. The three blades are connected together to lead 213, which is connected to the variable potentiometer 214, as shown. The contacts 208, 209 and 210 are connected to one side of measuring condensers 106, 134 and 159 respectively, and when in closed position will discharge these condensers to the potential of 214 in accordance with the variable potentiometer setting. The additional switch blade 207 in contact 211 will be opened at the time of resetting. This switch blade is desirable when a switching circuit is employed similar to that shown in Fig. 3, wherein the second tube 65 is rendered conducting by the second impulse and it is necessary to extinguish this tube before the next operation. The lead 215 shown connected to the resistance 216 is in the plate circuit of both tubes of Fig. 3, and when this is broken, the tubes are extinguished.

Summarizing the operation of the circuit of Fig. 4, thus far, when the switching circuit 85 receives an impulse at the terminals 92 at the beginning of the interval, the bias of tube 83 will be changed so that the standard frequency source 80 impressed on grid 82 will cause the plate-cathode circuit of 83 to be conducting during the positive pulses of said frequency source. The intermittent conduction of this tube places charges on the first measuring condenser 106. This condenser continues charging until a predetermined number of pulses have been placed thereon, whereupon it is discharged through tube 110 which places a single charge on the second measuring condenser 134. Measuring condenser 106 continues charging and discharging during the interval. When the second measuring condenser 134 has received a predetermined number of charges, it will be discharged through tube 138 which will place a single impulse on the next measuring condenser 159, and condenser 134 will continue charging and discharging similar to 106. When measuring condenser 159 has received a predetermined number of charges, it will discharge through tube 163, which will place an impulse on the counter 171. At the end of the interval, a second impulse will be received at terminals 93 of circuit 85, which will extinguish the first tube, and then bias on 82 will again be established such as to render this tube non-conducting. Each of the electron tube voltmeters 202, 201, 200, and the counter 171 will then have a reading thereon which will show the number of pulses which have been received. In order to reset the device, switch 203 is moved to the right (as shown in Fig. 4), discharging the condensers and breaking the switching circuit supply to 85. It is to be understood, of course, that the particular type of switch 207 for re-setting the switch circuit 85 depends upon the particular circuit used; also that the number of electron tube voltmeters and measuring condensers may vary in accordance with the use of the instrument. It is also to be pointed out that an irregular number of impulses may be counted over a definite period by allowing the impulses to be placed upon the grid 82 in place of a standard source of frequency and using a predetermined time interval to operate switching circuit 85. In this manner, the number of impulses received on tube 83 over a given period of time may be counted.

In order to set the instrument and make certain that the sub-multiple ratio or scaling rates are correct, a monitoring device, shown generally at 230, may be used. A conventional cathode ray tube 231 is shown, having vertical deflection plates 232 and horizontal deflection plates 233 with the usual beam focusing plates 234 and grid 235. The negative voltage for these elements is obtained from the voltage divider 236 and terminal 237 of the power supply. 238 may be the conventional cathode, and condensers 240 the usual by-pass condensers employed in a cathode ray tube circuit. The switch shown generally at 241 may have blades 242 and 243 connected together by a schematic switch operator 244. When it is desired to ascertain the scaling rate of the first scaling circuit or the number of pulses placed on measuring condenser 106 for each discharge thereof, switch blades 242 and 243 are placed on contacts 245 and 246 respectively. Tubes 83 and 110 may be considered to be in first scaling circuit, for example. Switch blades 242 will thereby connect the vertical plates 232 through lead 247 with the input frequency of tube 83 or the impulse frequency placed on condenser 106. The switch blade 243 will connect the horizontal plates 233 through lead 248 across measuring condenser 106, which will give the number of discharges of the condenser. The cathode ray tube will then give an indication of the number of impulses placed on the condenser to a single discharge of the condenser, thereby giving the dividing or scaling ratio of this portion of the circuit. Similarly, the scaling rate of the second scaling circuit may be determined by placing switch blades 242 and 243 on contacts 249 and 250, which will connect the vertical plates with the input of tube 127 through lead 251, and the horizontal plates across the measuring condenser 134 through lead 252. The second scaling circuit may be considered to include amplifier tube 116 and tubes 127 and 138. In the same manner, the scaling rate of the third circuit may be determined by placing switch blades 242 and 243 on contacts 253 and 254 respectively, which will connect the input of tube 155 through lead 254 to the vertical plates and condenser 159 through lead 255 across the horizontal plates of the cathode ray tube. In this manner, the scaling rate of each circuit may be easily determined and corrected if not that desired. The scaling rate or ratio of impulses received on a measuring condenser to discharge thereof may be adjusted in each of the scaling circuits by altering discharge characteristics of the electronic tube connected across the measuring condenser. This may be accomplished by adjustment of the grid voltage of each of the discharge tubes 110, 138, 163, by means of potentiometer 113, 145, 168, respectively. Other means of changing the scaling rate may be employed, such as varying the screen grid voltage or input signal of the tube employed to charge the measuring condenser. It is evident that the individual scaling rate of each circuit does not necessarily have to be the same, but it is easier to read the same if they are in decimal ratio.

Figure 5:
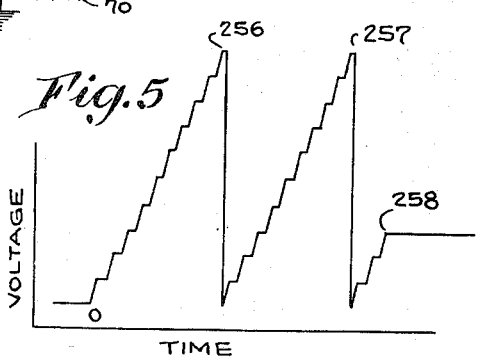
Fig. 5 is a graphic representation of a counting operation.

In Fig. 5 will be found diagrammatically an indication of the way in which the device will operate, in which the vertical scale is the voltage across the condenser and the horizontal scale is time. Then the first condenser will be seen to build-up in steps until it reaches the discharge point 256, at which time it will discharge and start building up again to the point 257. At the end of the interval, for example 258, there will be a residual number of impulses on the first condenser. Impulses 256 and 257 will be on the second condenser and may be read by the electron tube voltmeter. It is noticed that there will be three impulses remaining on the first condenser so that the total number of impulses will be twenty three (23).

In Fig. 6 there will be found a schematic diagram of a manner in which the invention may be employed to count irregular impulses during a predetermined interval, reference being made to the foregoing specification for details of the parts therein. 275 may be the source of irregular impulses, such as a Geiger-Mueler counter, and 276 the switching circuit similar to 85 of Fig. 4 wherein the impulses placed on 277 and 278 (corresponding to 92 and 93 of Fig. 4) may be indicative of a predetermined time. The scaling circuit is shown in box 279 and may be similar to that just described for Fig. 4 or Fig. 1, the lead 280 corresponding to 19 of Fig. 1. In this use, the device will count the impulses received for a given interval. Where the term "recurrent" is used in the claims, it may mean regular or irregularly spaced impulses.

The device described herein provides a simple and flexible counting means for accurately indicating time or impulses for a given time. The invention is to be broadly construed as including all equivalents coming within the scope of the appended claims.

What is claimed is:

1. In a device for measuring intervals, a constant frequency circuit, a normally non-conducting electronic tube having said constant frequency circuit connected thereto; means to render said tube conductive under control of the recurrent pulses of said constant frequency circuit at the beginning of the interval to be measured, a condenser in the plate-cathode circuit of said tube chargeable during each of said conduction pulses by a known increment of charge, a second tube connected to said condenser serving to discharge the condenser after a predetermined number of increments of charge are placed thereon by the recurrent conduction pulses of the first tube, means to render the first tube non-conducting again at the end of the interval, and means to measure the number of discharges of the condenser and the number of increments of charge remaining thereon, thereby directly measuring time.

2. In a device for measuring intervals, an oscillating circuit, a normally non-conducting electronic tube having said oscillating circuit connected thereto, means to render said tube conductive under control of the recurrent pulses of said oscillating circuit at the beginning of the interval to be measured, a condenser in the plate-cathode circuit of said tube chargeable during each of said conductions by a known increment of charge, a second tube connected to said condenser serving to discharge the condenser after a predetermined number of increments of charge are placed thereon by the recurrent pulses of the first tube, means to render the first tube non-conducting again at the end of the interval, and means to measure the number of discharges of the condenser and the number of increments of charge remaining thereon, thereby giving an indication of the number of impulses during the interval.

3. In a device for measuring intervals, an oscillation circuit, a normally biased non-conducting electronic tube having said oscillation circuit connected to a control element thereof, means to bias said tube at the beginning of the interval so that it becomes intermittently conducting during the application thereto of the recurrent pulses of said oscillation circuit during the interval, a condenser in the plate circuit of said tube chargeable with known increments of charge by the recurrent pulses of current in the plate circuit thereof, a second tube connected to said condenser and adapted to become conducting to discharge the condenser after a predetermined number of increments of charge due to recurrent pulses of the first tube have collected on the condenser, means to render the first tube non-conducting at the end of the interval, and means to measure the number of times said second tube becomes conducting during the interval and to measure the number of increments of charge remaining upon the condenser.

4. In an impulse counting device, a source of electrical impulses, a normally non-conducting electronic tube having a control element connected to said source of electrical impulses, variable biasing means connected to a control element to raise the potential of said element during an interval so that each electrical impulse will render the tube momentarily conducting, a condenser in the plate-cathode circuit of said tube whereby each electrical impulse during the interval places a known increment of charge on said condenser, a second tube connected to said condenser and so biased as to discharge the condenser after a predetermined number of increments of charge have been placed thereon, and means to measure the number of discharges of the condenser and the number of increments of charge remaining thereon, thereby giving an indication of the number of impulses during the interval.

5. In an impulse counting device, a source of impulses, a normally non-conducting electronic tube having its control element connected to said source of impulses, variable biasing means connected to said control element to raise the potential of said element during an interval so that each impulse will render the tube momentarily conducting, a condenser in the plate-cathode circuit of said tube whereby during the interval each impulse will cause a known increment of charge to appear on the condenser, a second tube connected to said condenser and serving to discharge the condenser therethrough after a predetermined number of increments of charge have appeared thereon, and means to measure the number of times said second tube has discharged the condenser and the increments of charge remaining thereon.

6. In an impulse counting device, a source of impulses; a normally non-conducting electronic tube having its control element connected to said source of impulses; biasing means connected to said control element, said bias being variable so that during a predetermined interval each impulse will render the tube momentarily conducting; a condenser in the plate-cathode circuit of said tube whereby each impulse places a known increment of charge on the condenser during the interval; a second tube connected to said condenser and so biased as to discharge the condenser after a predetermined number of increments of charge have been placed thereon; a third tube responsive to the discharge of the condenser through said second tube, said third tube having a condenser in the plate-cathode circuit thereof which has a known increment of charge placed thereon as a result of each impulse received from the second tube; and means to measure the charges on the measuring condensers, thereby giving an indication of the number of impulses.

7. In a device for measuring intervals, a constant frequency circuit; a normally non-conducting electronic tube having said constant frequency circuit connected thereto; means to render said tube conductive under control of the recurrent pulses of said constant frequency circuit at the beginning of the interval to be measured; a measuring condenser in the plate-cathode circuit of said tube and chargeable by known increments of charge during said conduction; a plurality of circuits in cascade therewith, each having a measuring condenser and an electronic control tube connected to the preceding measuring condenser, said electronic control tubes discharging the preceding measuring condensers when a predetermined number of increments of charge have been placed thereon, thereby creating an impulse and increment of charge which is placed on the next measuring condenser; means to render the first tube non-conducting again at the end of the interval; and means to measure the number of increments of charge on each measuring condenser at the end of the interval.

8. In a device for measuring intervals, a constant frequency circuit; a normally non-conducting electronic tube having said constant frequency circuit connected thereto; means to render said tube conductive under control of the recurrent pulses of said constant frequency circuit at the beginning of the interval to be measured; a measuring condenser in the plate-cathode circuit of said tube and chargeable during each of said conductions by a known increment of charge; a plurality of circuits in cascade therewith, each having a measuring condenser and a gaseous tube connected to the preceding measuring condenser, said measuring condensers being in the plate-cathode circuits of said tubes, each of said gaseous tubes also being connected to discharge the condenser in its plate-cathode circuit and impress a known increment of charge resulting from each discharge on the next measuring condenser; means to render the first tube non-conducting again at the end of the interval; and means to measure the number of increments of charge on each measuring condenser at the end of the interval.

9. In a device for measuring intervals, a constant frequency circuit; a normally non-conducting electronic tube having said constant frequency circuit connected thereto; means to render said tube conductive under control of the recurrent pulses of said constant frequency circuit at the beginning of the interval to be measured; a measuring condenser in the plate-cathode circuit of said tube and chargeable by known increments of charge during said conduction; a plurality of circuits in cascade therewith, each having a measuring condenser and an electronic control tube connected thereto, said measuring condensers being in the plate-cathode circuits of said tubes, said electronic control tubes also being connected to discharge the condenser in its plate-cathode circuit and impress a known increment of charge resulting from each discharge on the next measuring condenser; means to render the first tube non-conducting again at the end of the interval; and inverted electronic tube voltmeter circuits connected to at least some of the measuring condensers to give a measurement of the number of increments of charge on each.

10. In an electrical counting device, a condenser chargeable in accordance with recurrent impulses; an electronic tube through which said condenser discharges after a predetermined number of impulses have been placed on said condenser thereby giving an impulse for each predetermined number of impulses received on the condenser; a monitoring circuit including a cathode ray tube having two sets of deflection plates, one set being connectable to the condenser to deflect the beam in accordance with the impulses placed on the condenser and one set of plates being connectable to the electron tube circuit to deflect the beam in accordance with the discharge of the condenser, thereby giving the counting ratio of the circuit.

11. In an interval measuring device, a condenser circuit connected to a source of constant frequency during the interval to be measured; an electronic tube through which said condenser discharges after a predetermined number of impulses have been placed thereon by the source of constant frequency, said discharges creating impulses which occur with a frequency which is a sub-multiple of the constant frequency; and a monitoring circuit including a cathode ray tube having two sets of beam deflection plates in different planes, one set being connectable to be responsive to the source of constant frequency, and the other set being connectable to be responsive to a pulse at the discharge of the condenser, thereby giving a visual indication of the ratio of the constant frequency to the sub-multiple frequency.

12. In an electrical counting device, an electronic tube responsive to recurrent impulses during a predetermined interval; a condenser charged with known increments of charge thereby; an electronic control tube having said condenser connected in the plate-cathode circuit thereof, said tube being biased so that when a predetermined number of known increments of charge are received on said condenser the condenser will discharge through said electronic control tube; a transformer having one winding in the plate-cathode circuit of said electronic control tube and producing an impulse in the other winding thereof upon discharge of the condenser; and means to measure the number of increments of charge remaining on the condenser and discharged through said transformer.

13. In a device for measuring intervals, a constant frequency circuit, a normally biased non-conducting electronic tube having said constant frequency circuit connected to a control element thereof, means to bias said tube at the beginning of the interval so that it becomes conductive under control of the recurrent pulses of said constant frequency circuit during the interval, a condenser in the plate circuit of said tube chargeable by known increments of charge by the recurrent pulses, a second tube having said condenser in its plate-cathode circuit and adapted to become conducting to discharge the condenser after a predetermined number of known increments of charge due to recurrent pulses of the first tube, a transformer in the plate-cathode circuit of said second tube producing an impulse upon each discharge of the condenser, means to render the first tube non-conducting again at the end of the interval, and means to measure the number of pulses of the transformer and the number of increments of charge remaining on the condenser.

14. In an electrical counting device, a source of electrical impulses; a normally biased non-conducting electronic tube; means to change said bias to render said tube conductive under control of the impulses during a predetermined interval; a condenser charged by known increments by each impulse received by said electronic tube during the interval; an electronic control tube having a plate-cathode circuit with said condenser therein; means to bias said electronic control tube so that when a predetermined number of known increments of charge are placed on the condenser, the condenser will discharge through said electronic control tube; and means to measure increments of charge on the condenser and discharges of said control tube.

15. In a device for measuring intervals, a constant frequency circuit, a normally biased nonconducting electronic tube having said constant frequency circuit connected to a control element thereof, means to bias said tube at the beginning of the interval so that it becomes conductive under control of the recurrent pulses of said constant frequency circuit during the interval, a condenser in the plate circuit of said tube chargeable by known increments of charge due to the recurrent pulses, a second tube having said condenser in its plate-cathode circuit and adapted to become conducting to discharge the condenser after a predetermined number of increments of charge due to recurrent pulses of the first tube, a transformer in the plate-cathode circuit of said second tube producing an impulse upon each discharge of the condenser, an amplifier circuit and a measuring condenser connected to said transformer receiving the increments of charge produced by said transformer, means to render the first tube non-conducting at the end of the interval, and means to measure the number of increments of charge on each of the condensers.

COLIN IRVING BRADFORD.

CERTIFICATE OF CORRECTION.

Patent No. 2,301,197. November 10, 1942.

COLIN IRVING BRADFORD.

It is hereby certified that error appears in the printed specification of the above numbered patent requiring correction as follows: Page 2, second column, line 34, for "place" read --placed--; page 3, first column, line 64, after "measured" insert --and the standard source of frequency. The--; page 4, second column, line 66, for "terminal" read --internal--; page 5, first column, line 66, for "ratio" read --ratios--; and that the said Letters Patent should be read with this correction therein that the same may conform to the record of the case in the Patent Office.

Signed and sealed this 30th day of March, A. D. 1943.

Henry Van Arsdale,
Acting Commissioner of Patents.

(Seal)

CERTIFICATE OF CORRECTION.

Patent No. 2,301,197.   November 10, 1942.

COLIN IRVING BRADFORD.

It is hereby certified that error appears in the printed specification of the above numbered patent requiring correction as follows: Page 2, second column, line 34, for "place" read --placed--; page 3, first column, line 64, after "measured" insert --and the standard source of frequency. The--; page 4, second column, line 66, for "terminal" read --internal--; page 5, first column, line 66, for "ratio" read --ratios--; and that the said Letters Patent should be read with this correction therein that the same may conform to the record of the case in the Patent Office.

Signed and sealed this 30th day of March, A. D. 1943.

(Seal)

Henry Van Arsdale,
Acting Commissioner of Patents.